United States Patent [19]

Kumar et al.

[11] Patent Number: 5,680,597

[45] Date of Patent: Oct. 21, 1997

[54] SYSTEM WITH FLEXIBLE LOCAL CONTROL FOR MODIFYING SAME INSTRUCTION PARTIALLY IN DIFFERENT PROCESSOR OF A SIMD COMPUTER SYSTEM TO EXECUTE DISSIMILAR SEQUENCES OF INSTRUCTIONS

[75] Inventors: Manoj Kumar; Michael Mi. Tsao, both of Yorktown Heights, N.Y.

[73] Assignee: International Business Machines Corporation, Armonk, N.Y.

[21] Appl. No.: 378,756

[22] Filed: Jan. 26, 1995

[51] Int. Cl.$^6$ .............................. G06F 9/30; G06F 15/80
[52] U.S. Cl. ............................................. 395/567; 395/800
[58] Field of Search .................................. 395/375, 800, 395/727, 164, 567

[56] References Cited

U.S. PATENT DOCUMENTS

| 4,783,738 | 11/1988 | Li et al. ................................. 395/800 |
| 4,992,933 | 2/1991 | Taylor . |
| 5,179,714 | 1/1993 | Graybill . |
| 5,212,777 | 5/1993 | Gove et al. . |
| 5,239,654 | 8/1993 | Ing-Simmons et al. . |
| 5,253,308 | 10/1993 | Johnson . |
| 5,511,212 | 4/1996 | Rockoff ................................... 395/800 |
| 5,522,080 | 5/1996 | Harney ................................... 395/727 |
| 5,542,074 | 7/1996 | Kim et al. ............................... 395/800 |

FOREIGN PATENT DOCUMENTS

| 0237013 A2 | 9/1987 | European Pat. Off. ........ G06F 15/80 |
| 0314277 A2 | 5/1989 | European Pat. Off. ........ G06F 15/06 |

OTHER PUBLICATIONS

D. W. Blevins et al, "Blitzen: A Highly Integrated Massively Parallel Machine" Feb. 8, 1990. J. of Parallel & Distributed Computing #2 pp. 150–160.

J.B. Rosenberg et al, "Mapping Massive SIMD Parallelism onto Vector Architectures for Simulation" Software Practice & Experience pp. 739–756.

*Primary Examiner*—Richard L. Ellis
*Assistant Examiner*—Gautam R. Patel
*Attorney, Agent, or Firm*—Whitham, Curtis, Whitham & McGinn; Robert P. Tassinari, Jr.

[57] ABSTRACT

A single instruction multiple data stream ("SIMD") processor includes multiple processing elements ("PEs"). Each PE includes a memory, a first multiplexer, an instruction register, a local instruction buffer for storing an instruction and a unit for modifying the instruction, in its entirety, to create a modified instruction. The modified instruction is stored in the local instruction buffer until it is executed. This structure modifies the instruction broadcast from the central controller of an SIMD computer in its entirety and creates modified instructions which can be unique to each PE.

18 Claims, 9 Drawing Sheets

FIG.9

SYSTEM WITH FLEXIBLE LOCAL CONTROL FOR MODIFYING SAME INSTRUCTION PARTIALLY IN DIFFERENT PROCESSOR OF A SIMD COMPUTER SYSTEM TO EXECUTE DISSIMILAR SEQUENCES OF INSTRUCTIONS

BACKGROUND OF THE INVENTION

1. Field of the Invention

The present invention generally relates to single-instruction-stream-multiple-data stream (SIMD) machines having a plurality of processing elements (PE) and a unique device therein in which efficiency of the machines is maintained even when executing different instructions in different PEs.

More particularly, the present invention relates to a method and apparatus in which a local instruction buffer or a local instruction memory is utilized, thereby allowing the applicability of SIMD machines to be extended to a much larger set of applications.

According to the present invention, a SIMD computer includes a plurality of processing elements each of which has a local instruction source, a multiplexor, and means for modifying the broadcast instruction to execute dissimilar sequences of instructions. The present invention is directed to allowing different processors to execute different instructions, depending on their logical index or data content.

2. Description of the Related Art

Parallel processing is widely regarded as the most promising approach for achieving the performance improvements essential for solving the most challenging scientific/engineering problems such as image processing, weather forecasting, nuclear-reactor calculations, pattern recognition and ballistic missile defense. Generally, parallel processors include a series of processing elements (PEs) each having data memories and operand registers and each of the PEs being interconnected through an interconnection network.

The performance improvements required are several orders of magnitude higher than those delivered by vector computers or general purpose computers currently used, or those expected from such machines in the future. The two most extensively explored approaches to parallel processing are the Single-Instruction-Stream-Multiple-Data-Stream (SIMD) approach and the Multiple-Instruction-Stream-Multiple-Data Stream (MIMD) approach.

SIMD includes a large number of processing elements having private data memories and arithmetic logic units (ALUs) which simultaneously execute the same sequence of instructions (e.g., program) broadcasted from a centralized control unit (e.g., a central processing unit (CPU)). Specifically, the central control unit (e.g., an array controller) accesses a program from a host computer or the like, interprets each program step and broadcasts the same instructions to all the processing elements simultaneously. Thus, the individual processing elements operate under the control of a common instruction stream.

The MIMD approach includes a large number of processing elements having their own program memories and control units which enable them to simultaneously execute dissimilar sequences of instructions from a program. Thus, the MIMD parallel computer has each processing element in the array executing its own unique instruction stream with its own data.

Both the SIMD and MIMD approaches to parallel processing have their respective advantages and disadvantages. For example, in SIMD machines interprocessor communication can be synchronized with the execution of instructions in the processors to avoid synchronization overheads.

Further, interference in the network can be eliminated by scheduling the interprocessor communication at compile time. This feature allows the network to sustain higher communication bandwidth, which results in lower communication overheads, and thus more efficient execution of the program.

Therefore, SIMD machines usually outperform MIMD machines of comparable hardware complexity on problems where the calculations have a very regular structure so that data can be partitioned among the multiple processors of the SIMD machine and then the different sections of the data can be processed by the identical sequence of instructions delivered to each processor from the central controller.

Furthermore, since the individual processors in a SIMD machine do not have their own program memory and instruction fetch and decode logic, SIMD machines have a simpler design (as compared to MIMD machines discussed below) with less hardware, and therefore have lower development and manufacturing costs. Several SIMD machines are commercially available today.

However, for certain applications such as sparse matrix-based calculations, it is cumbersome to process different sections of data with the same sequence of instructions because different sections of data can be stored in different formats optimized for the sparsity of each section. Then, different sequences of instructions are required to access the data stored in different formats. Even in applications in which calculations are predominantly regular/homogeneous in nature and well-suited to SIMD processing (e.g., the computational fluid dynamics applications using explicit techniques on regular grids), there are heterogeneous components such as the calculations for boundary elements, interspersed with the main calculation. The presence of these heterogeneous components reduces the ultimate performance of a SIMD computer.

For example, most numerical methods employed to simulate the behavior of a physical system describe the system as a set of properties (e.g., temperature, pressure, density, etc.). Each of these properties is defined as a function of time at each of a collection of grid points. Some of these grid points are surrounded by other grid points and are known as interior grid points. Other grid points are at the boundary of the system being simulated, and are therefore not completely surrounded by other grid points. These are the boundary grid points. Very often, the equations or physical laws that accurately model the behavior of the system at an interior grid point are different from the equation used to model the behavior of boundary points. Consequently, the program or instruction sequence used to compute the behavior of interior points is different from the instruction sequences used to compute the behavior of the boundary points.

When applications of the above type are programmed on parallel computers, the grid points of the physical system being simulated are partitioned among the PEs, each PE receiving an equal number of grid points. Usually, the interprocessor communication constraints result in some PEs receiving only interior grid points, while the remaining PEs have boundary grid points distributed across them in addition to the interior grid points assigned to them. FIG. 8 shows a 2-dimensional system with 64 grid points, the interior grid points being depicted by circles at the intersection of the hashed lines while the boundary grid points are marked by an X. If this system were to be simulated on a 16 processor SIMD machine, one possible partitioning of the grid points between the 16 processors is as shown in FIG. 9. In this partitioning scheme four processors get one interior grid point and three boundary points, eight PEs get two interior and two boundary points, and the remaining four processor get four interior points each.

If a 16-processor SIMD parallel computer were used to simulate the above-mentioned system, partitioned across PEs according to FIG. 9, then the central controller will issue the instruction sequence required to process an interior grid point four times to enable processors P5, P6, P9 and P10, to complete the calculations assigned to them. During this period, processors P0, P3, P12 and P15 process only one interior grid point, and are therefore idle ¾ of the time. The other eight processors are idle half of the time. After issuing the instruction sequence for interior point calculations four times, the central controller must dispatch the instruction sequence for boundary point calculations three times to allow processors P0, P3, P12, P15, to complete their calculations. Processor P5, P6, P9 and P10 are idle during this period and the remaining eight procdessors are utilized only ⅔ of the time.

MIMD computers have the advantage of being able to handle the above-mentioned situations much more efficiently than a SIMD computer. Generally, the processing elements of the SIMD computer are simpler and more numerous than that in an MIMD computer.

Thus, SIMD parallel computers outperform the MIMD computers on some applications, and the MIMD parallel computers are better on others. Hitherto the invention, there has been no machine optimizing the performance of both the SIMD and MIMD computers.

In a first conventional SIMD machine, an SIMD array processor with global instruction control and re-programmable instruction decoders is provided in which programmable decoding hardware is used in each processing element. This programmable hardware always modifies the selected bits of the instruction attached to it in an identical manner until the hardware is reprogrammed by loading different information in the control storage associated with it.

The above system is disadvantageous for several reasons. For example, there is no use of a local instruction buffer for storing a single instruction, or several blocks of several instructions each.

Further, the broad interpretation of modifying instructions locally within the processors of a SIMD machine is known. Most SIMD computers use mask registers for disabling operations in a processor. The processing elements in a parallel computer (e.g., a GF11 parallel computer) could locally modify the selection of source operand in network load operation, as suggested in above-mentioned conventional machine, change the ALU operation in a restricted manner, and modify the memory addresses locally.

However, in the conventional systems, the type of modifications possible locally are limited by the hardware support implemented in the processing elements. Thus, there is a limit to the modification possible because a structure other than the general purpose ALU computes the modified instruction.

Indeed, the conventional approach is directed to modifying operands in an instruction, and more specifically, operands that appear in an identical position in all instructions. In the conventional systems, there is no means for modifying the entire instruction altogether.

Further, programmable hardware support, as in the above conventional system, is useful in situations where identical modification has to be applied to all instructions over a long time period, such as when the logical connectivity of the processing elements is defined for the entire duration of a program's execution by creating a mapping between the physical neighbors (hardware connectivity) and logical neighbors (logical connectivity). This is because once the cost of programming the programmable decoding hardware is incurred, there is no additional cost of modifying subsequent instructions in an identical manner.

However, to allow different processors to execute different instructions, depending on their logical index or data content, in the conventional approach described above has serious limitations as described hereinbelow.

For example, if the programmable decoding hardware is kept simple, such as including a conventional lookup table (LUT), then the approach could be used to modify only those bits in the instruction which constitute an operand occurring in all instructions at the same location, and requiring identical modification in all instructions. This is a serious limitation of the conventional systems, and particularly does not easily allow the modification of the OPCODE (the operation codes) itself.

Furthermore, if the programmable decoding hardware is designed to make more general modifications to the instruction, it will become too complex and/or too slow, thereby nullifying the advantages of SIMD approach.

In another conventional system, a multiprocessor is provided which is reconfigurable in SIMD and MIMD modes. In this system, each processing element connects to an independent instruction memory which serves as a cache to a shared external instruction memory. Each processing element has complete instruction fetch and decode logic circuitry to operate as a fully autonomous processor in the MIMD mode, without any further sequencing or synchronizing signals being received from the central controller. Special synchronization circuits are provided to change modes from a SIMD to a MIMD, and to operate in lock-step in SIMD mode.

This system also is disadvantageous since there is an external instruction memory dedicated to the processors or shared therebetween. Since the processors autonomously fetch instructions, instruction fetch and decode logic and synchronization circuits are required in each processing element.

Further, in this conventional system, the hardware in each processing element, the independent instruction memory for each processor, the shared external instruction memory, and the instruction fetch and decode logic and synchronization circuits, provide complete autonomy to the processing elements to execute in the MIMD mode. However, this extra logic adds to the complexity and therefore the cost of the processing elements, without providing any significant additional advantages for most scientific/engineering applications.

Yet another conventional system includes a plurality of two-dimensional processing elements where all processors in a row execute the same program, and thus operate in a SIMD mode, while the different rows operate independently of each other, thus operating in a MIMD mode at the row level. This system has no capability in the processing elements in a row to locally modify the identical instructions they receive.

FIG. 1 illustrates a generic structure of a processing element (PE) 1 in a SIMD computer. All the details which differentiate the processing element of one SIMD computer from another have been omitted, but the essential characteristics of all SIMD computers are shown.

The instructions executed by the processing element (PE) 1 are received from an external source 100 shown in FIG. 5, which may include, for example, the central controller or an array controller. Typically, the array controller is in turn connected to a host computer which can be a mainframe or a personal computer. The width of the instruction words can be selectively chosen by the designer as required. For example, the instructions could be 32 bits to 256 bits wide.

Upon receipt into an instruction register 2, each instruction is executed to access data from the private data memory 3 of the PE 1, and to perform the desired operations on this data using the arithmetic logic unit (ALU) 4, before storing the data back to the private memory 3.

Part of the instruction also controls the transfer of data between the memory 3 and the interconnection network 102 shown in FIG. 5. There is no instruction memory to store these instructions. The data memory 3 can be hierarchical, comprising registers, cache memory, main memory, etc., in which case the movement of data between various levels of the memory hierarchy is also controlled by the instruction received from the central controller.

Although FIG. 1 illustrates control signals directly from the instruction register 2 to the private data memory 3 and the ALU 4, additional control logic can be associated with the instruction register 2 to further decode the instructions received from the central controller before they are applied to the ALU 4 and data memory 3.

Based on data from the PEs' own data memory 3, usually the content of a condition code reigster, the PEs in almost all SIMD computers can partially or totally disable the current instruction in the instruction register 2 as shown by the dotted line labelled "Disable" in FIG. 1. This disabling capability is extremely useful for performing different operations on different data, but is inflexible and therefore very inefficient, in most situations identified above, for executing dissimilar sequences of instructions on different PEs.

SUMMARY OF THE INVENTION

It is therefore an object of the present invention to provide a SIMD computer which overcomes the above-described problems of the conventional systems.

Another object of the present invention is to provide a SIMD computer having processing elements in which the processing element can execute dissimilar sequences of instructions.

According to the present invention, the inventive structure takes advantage of the feature of SIMD machines having simple and efficient hardware which can be used optimally by scheduling the calculations and communication at compile time.

Further, the restriction of executing identical instructions in all PEs which often degrades the efficiency significantly in the conventional systems, is overcome by the structure of the present invention.

Specifically, by employing the local instruction buffer or the local instruction memory, as explained hereinbelow, the degradation of efficiency can be eliminated effectively and the applicability of SIMD machines can be extended to a much larger set of applications.

The present invention includes three hardware configurations, as discussed below, and a method of integrating them in the processing elements (PEs) of an SIMD parallel computer to provide these PEs the capability of executing dissimilar sequences of instructions.

These configurations have minimal impact on the simplicity of the PE design and the performance advantage of SIMD computers, and also allow the SIMD computers to avoid the major performance bottlenecks discussed above.

In a first aspect of the invention, a single instruction multiple data stream (SIMD) array processor is provided according to the present invention which includes a plurality of processing elements (PEs), each for receiving an instruction broadcasted from an external source. Each of the plurality of processing elements include a memory for storing data therein, a first multiplexer for receiving the broadcasted instruction, an instruction register, coupled to the memory and to the first multiplexer, for receiving an output from the first multiplexer and for providing control signals and an output to the memory, a storage means coupled to the instruction register and to the memory, for storing at least one instruction, the at least one instruction including data read out of the memory and placed in the storage means, the first multiplexer further receiving the at least one instruction in the storage means; and means for modifying the at least one instruction to respectively create a modified instruction and storing the modified instruction in the storage means to be executed as a next instruction, the modified instruction being used repeatedly when selected by the broadcasted instruction from the external source. The modifying means includes a device for selecting one of the broadcasted instruction and the modified instruction to be output to the instruction register.

With the inventive structure, the above problems of the conventional systems are overcome and the invnetive SIMD computer has processing elements in which the processing element can execute dissimilar sequences of instructions and in which the restriction of executing identical instructions in all PEs which often degrades the efficiency significantly in the conventional systems, is overcome by using the local instruction buffer or the local instruction memory. Processing efficiency can be maintained and the applicability of SIMD machines can be extended to a much larger set of applications.

BRIEF DESCRIPTION OF THE DRAWINGS

The foregoing and other objects, aspects and advantages will be better understood from the following detailed description of a preferred embodiment of the invention with reference to the drawings, in which:

Figure 9:
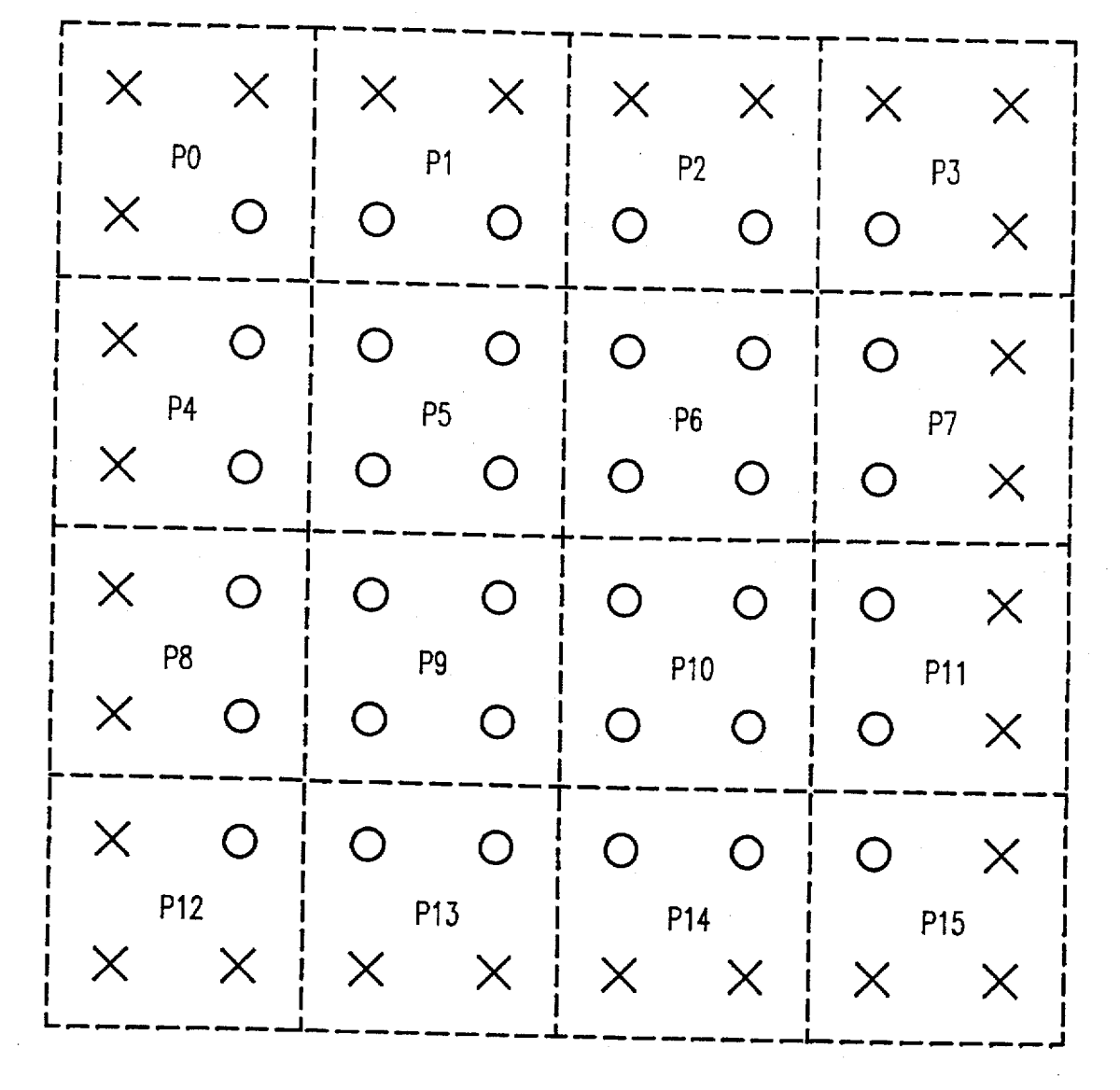

FIG. 9 illustrates a partitioning method of the grid points between 16 processors of the conventional two-dimensional system shown in FIG. 8.

DETAILED DESCRIPTION OF A PREFERRED EMBODIMENT OF THE INVENTION

Figure 2:
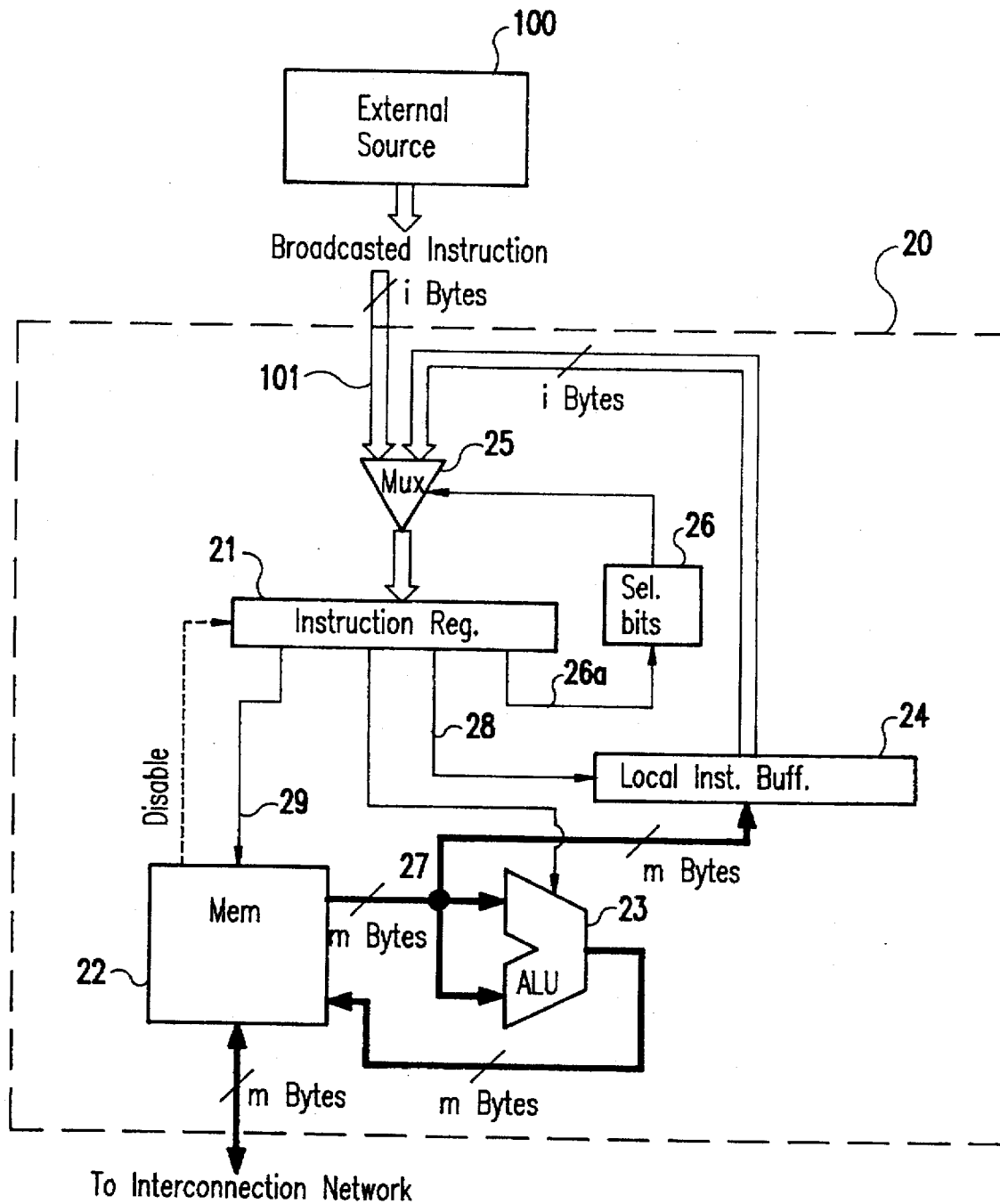
FIG. 2 illustrates a first embodiment of the present invention which incorporates a local instruction buffer in a processing element in an SIMD parallel computer.
Figure 5:
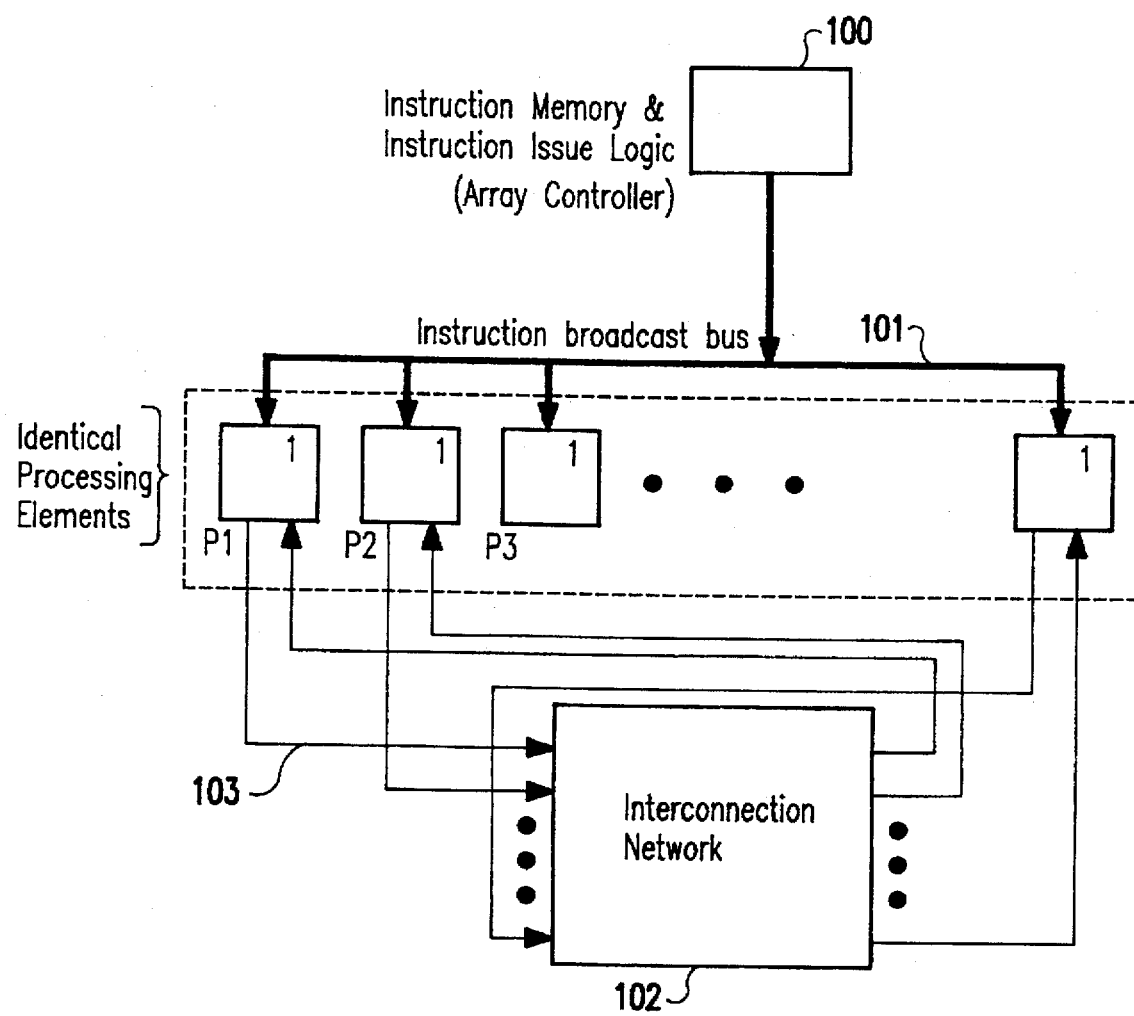
FIG. 5 illustrates an overall system including a plurality of processing elements and their interconnection in an array.

Referring now to the drawings, and more particularly to FIG. 2, there is shown a structure for enabling the processing elements (PEs) of a SIMD computer to execute dissimilar sequences of instructions. The number of PEs, which are typically in an array and are interconnected as is known in the art and as shown in FIG. 5, can be selected according to the requirements and applications of the user. Typical numbers vary from 8 to 65536.

For ease of illustration, FIGS. 2–4, as described in further detail below, illustrate a single processing element. Further, only the principal connections which are required for an understanding of the present invention are shown. The lines may be uni- or bi-directional as required and as illustrated.

The external source 100 in FIG. 5 issues broadcast instructions in parallel to the PEs via an instruction bus 101 as shown in FIG. 5.

Figure 1:
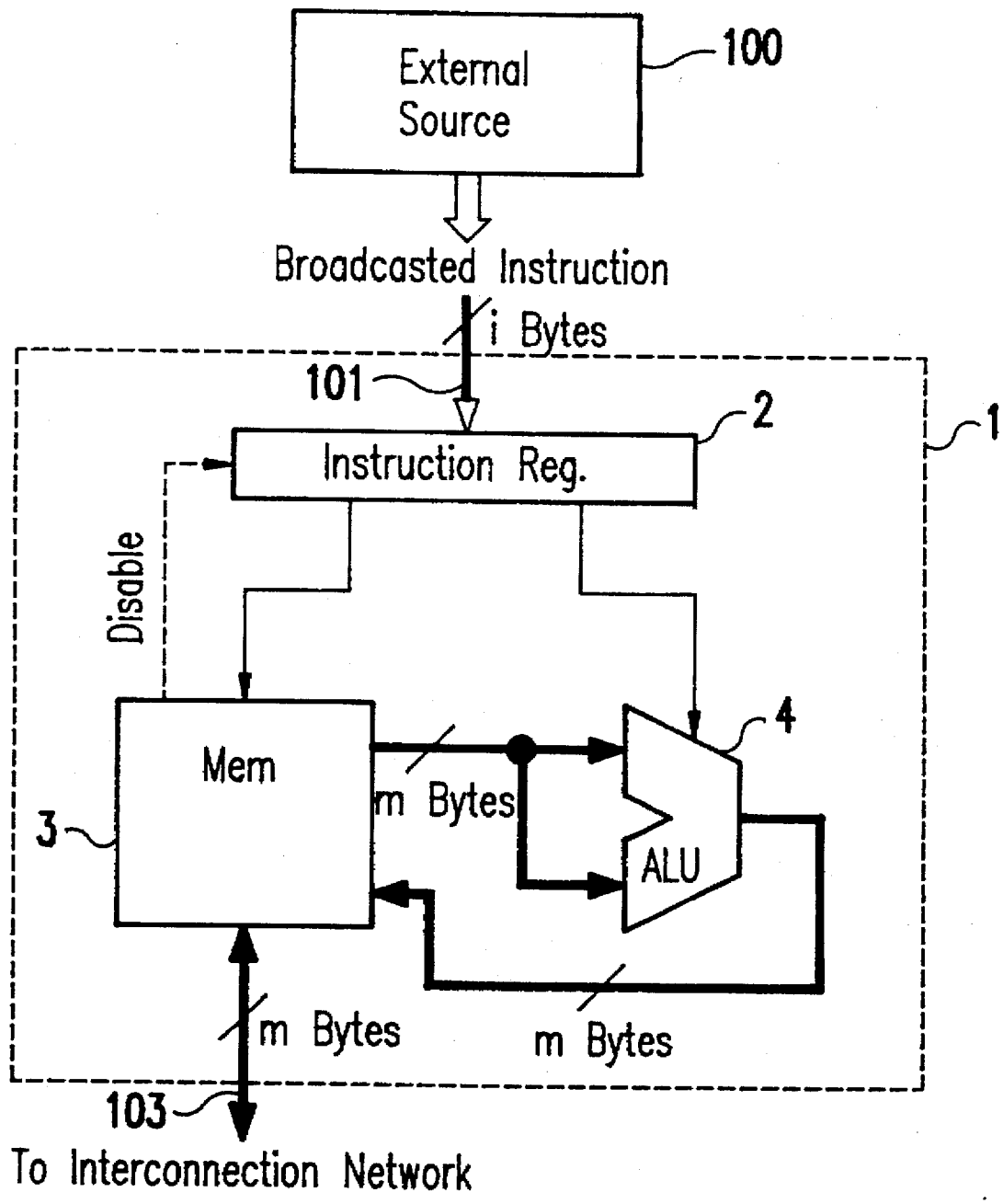
FIG. 1 illustrates the organization of a processing element (PE) in a conventional SIMD parallel computer adapted to receive a broadcast instruction from an external source.

Turning to FIG. 2 and looking at the present invention in greater detail, a processing element (PE) 20 includes an instruction register 21, a private data memory 22, and an ALU 23, similarly to the conventional system shown in FIG. 1.

However, the PE 20 according to a first aspect of the invention also includes a Local Instruction Buffer 24 in which an instruction can be assembled using data from the PE's private data memory 22 and then this locally assembled instruction can be executed by the PE 20. The PE 20 also includes a multiplexer 25, and select bits 26.

Assuming that the instruction word width is i-bytes and that i-bytes is much larger than the data memory width of m-bytes, a special instruction ILOAD (x, A) (e.g., "instruction load") is added to the instruction set of the PE 20 which causes the m-byte to be read out of the location A of the data memory 22 and to be placed in bytes m×x through m×(x+1)−1 of the local instruction buffer 24, where x and A are immediate operands of the ILOAD instruction.

To execute the ILOAD instruction, the PE 20 sends the address "A" of the m bytes in memory 22, along with a read signal, to the memory on control lines 29. It also sends the index x and a write enable signal to the local instruction buffer 24 on control lines 28. The read signal on control line 29 causes the m bytes at location A in the memory to be retrieved and placed on bus 27 which connects to the local instruction buffer 24 in addition to the ALU 23. The write enable signal on control line 28 causes the m bytes on bus 27 to be written into local instruction buffer bytes m, x through m (x+1)−1.

The PEs 20 are assumed to have the ability to locally modify the address field A of the ILOAD instruction by adding a local offset to it. The offset can be a default base register, or a contents of a general purpose register. Modifying the address field of a broadcast instruction in this manner is well known in the art.

The multiplexer 25, which receives an instruction input of i-bytes from the external source 100 (e.g., an array controller or central controller) as shown in FIG. 5 and an input of i bytes from the local instruction buffer 24, selects each m-byte block of the instruction from either the central controller or the instruction in the local instruction buffer 24 of the PE, in each machine cycle. For purposes of this application, the machine cycle is the basic timing cycle of the external source (e.g., the central controller or array controller).

The selected instruction is placed in the instruction register (buffer) 21 to be executed as the next instruction. The selection by the multiplexer 25 is controlled by the SELECT_BITS issued by select bits generator 26, each bit controlling the multiplexer 25 for m-bytes of the instruction word.

The select bits 26 are set by the central controller using another new instruction, SET_SEL_BITS, and the value to be placed in the select bits 26 is provided as an immediate operand of this instruction. The SET_SEL_BITS instruction is also broadcast by the external source to all PEs. Lines 26a carry the immediate operand of the SET_SEL_BITS instruction from instruction register 21 to the select bits 26 to set the select bits 26.

The select bits generator 26 are automatically cleared in each machine cycle unless they are being set explicitly by the SET_SEL_BITS instruction.

The select bits generator 26 allows for partial modification of the instruction broadcasted from the central controller, based on processor specific data by allowing some microoperations in the instruction to come from the central controller and other microoperations to be taken from the processor's local instruction buffer 24.

Another, more effective, way of using the select bits generator 26 is to allow each select bit to control one microoperation rather than a block of m-bytes.

The above discussion assumes that the instruction word is much longer than a data memory word. If the two lengths were comparable, a single select bit could be used to choose between the local instruction in the local instruction buffer 24 and the broadcasted instruction from the central controller. Typically, an instruction word is 16 to 256 bits long whereas a data memory word is 32 or 64 bits long.

To keep the programming paradigm simple, the microoperations that control the select bits generator 26 and the local instruction buffers 24 should preferably be received only from the broadcasted instruction. This feature can be enforced in hardware by wiring the corresponding lines of the broadcasted instruction directly to the instruction register 21.

The operation of the above system is described hereinbelow. To execute dissimilar sequences of instructions on processors of SIMD machines, first all instruction sequences are forced to be of equal size by "padding" the shorter sequences with NO-OP (null) instructions. The padding operation is a well known technique and is not described herein.

Thereafter, the following steps are performed by all processors for each instruction in its sequence.

First, the microoperations (or m-byte blocks), which are not identical in the instructions to be executed by all PEs, are assembled in the local instruction buffer 24. This is a two-step process. In the first step, the m-byte blocks needed to modify the instruction in each P are calculated in each PE's private data memory 22. This step, explained in detail below, can be omitted under certain conditions which are also explained below. Then, an appropriate number of ILOAD instructions, one for each m-byte block to be loaded into the local instruction buffer 24, are issued by array controller 100 to move the m-byte blocks from each PE's private data memory 22 to the local instruction buffer 24.

Then, a SET_SEL_BITS instruction is also issued by the central controller. Execution of this instruction causes the next instruction to include processor-specific microoperations from the local instruction buffer 24 while the remaining microoperations are taken from the instruction broadcast by The central controller.

To assemble the m-byte blocks in the PE's private data memory, which will be later used to modify an instruction broadcast from the central controller 100, a sequence of instruction, hereafter called the build_code_sequence is broadcast from the array controller 100 (external source) to each PE. However, since each PE can have different data in its private memory 22, the above-mentioned m-byte words calculated by the build_code_sequence can be different in each PE. The ability of each PE to locally disable the execution of any broadcast instruction as discussed earlier and as shown in FIG. 2, can also be used to assemble different m-byte words in each PE. The execution of a broadcast instruction is disabled locally in a PE based on processor specific data such as a particular bit in a condition code register, which can be set by other instructions of the PE's instruction set.

Figure 6:
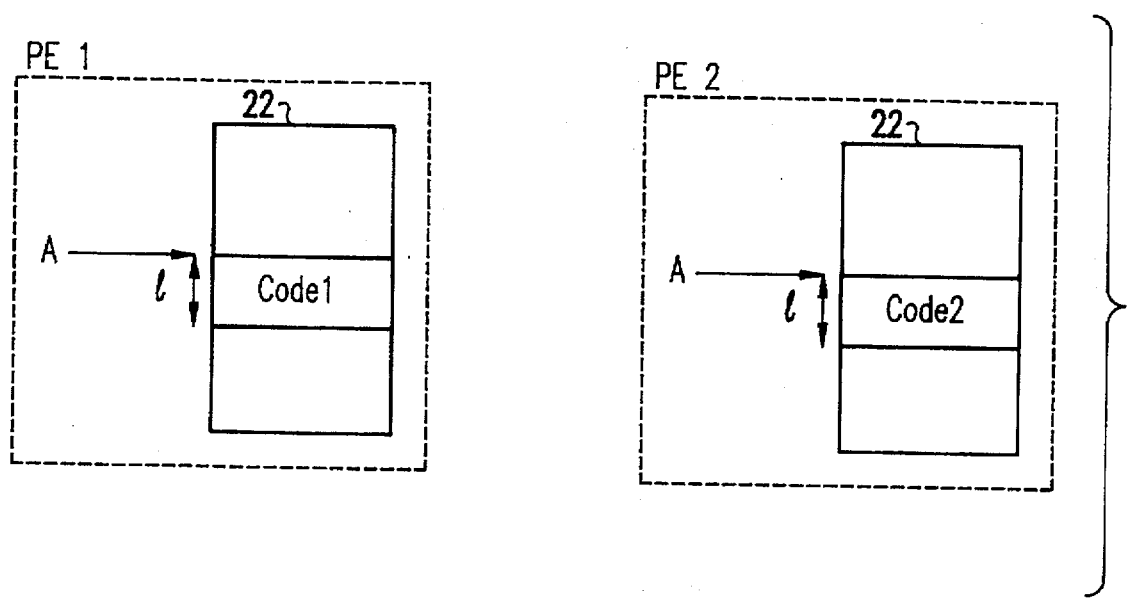
FIG. 6 illustrates a data memory of first and second processing elements of a representative SIMD computer.

FIG. 6 shows the data memory 22 of two PEs of the representative SIMD computer, after the execution of build_code_sequence instructions. The m-byte blocks of an instruction word calculated by these instructions, and stored in the PEs' private data memory 22 starting at address A, are different in the two PEs and labelled as code 1 and code 2.

The build_code_sequence instruction may not be needed if the m-byte words needed to modify a broadcast instruction have already been computed to modify a previously broadcast instruction, and saved in identical locations in the PE's local data memory 22 for later use.

Alternatively, the different sets of m-byte words used by different PEs to modify a broadcast instruction can be calculated at compile time, and all such sets of m-byte words can be loaded in all PEs private data memory 22, when the program is loaded in the array controller 100.

Figure 7:
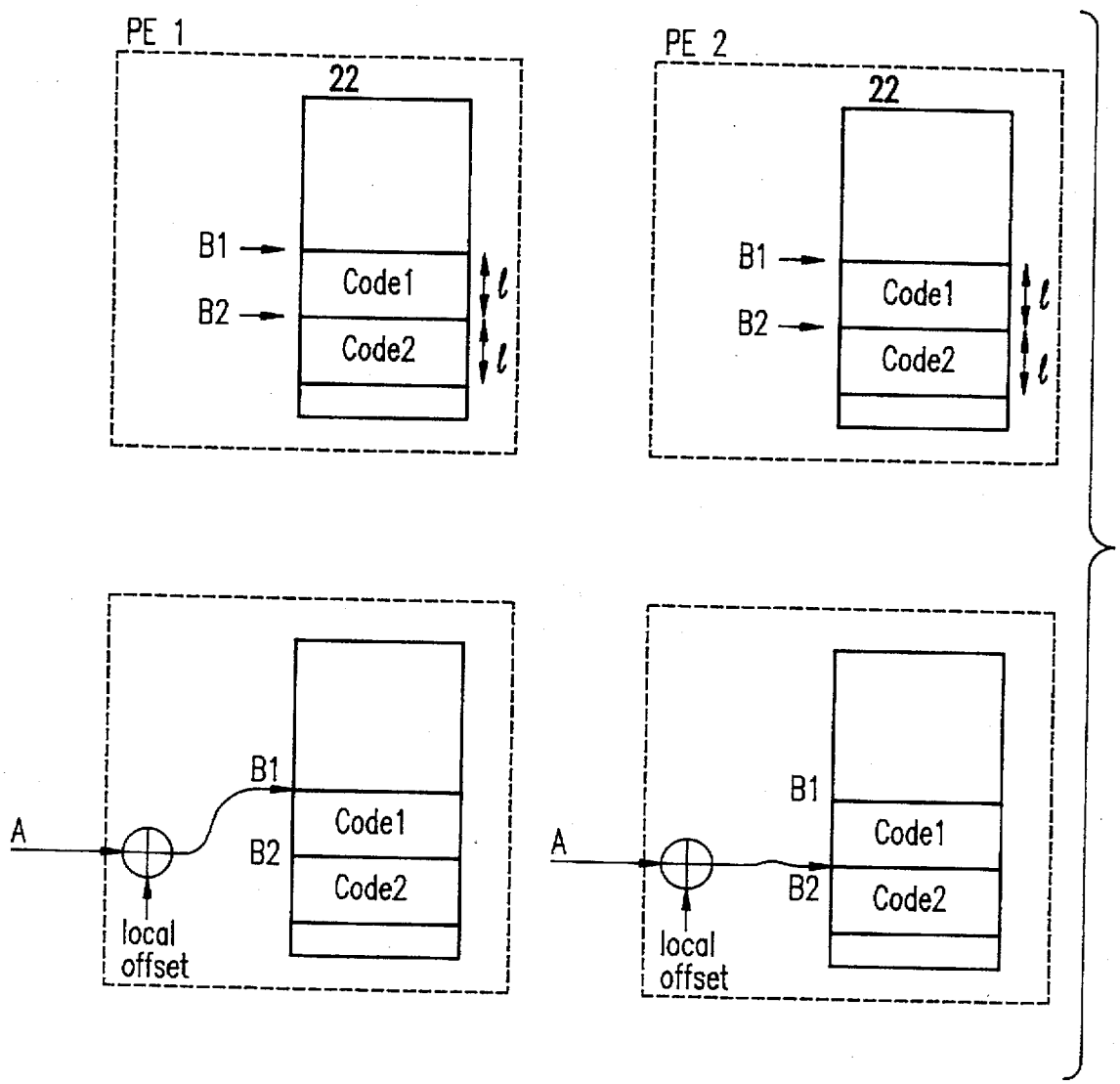
FIG. 7 illustrates first and second processing elements PE1 and PE 2 and modification of broadcast instruction using codes stored in the processing elements.
Figure 8:
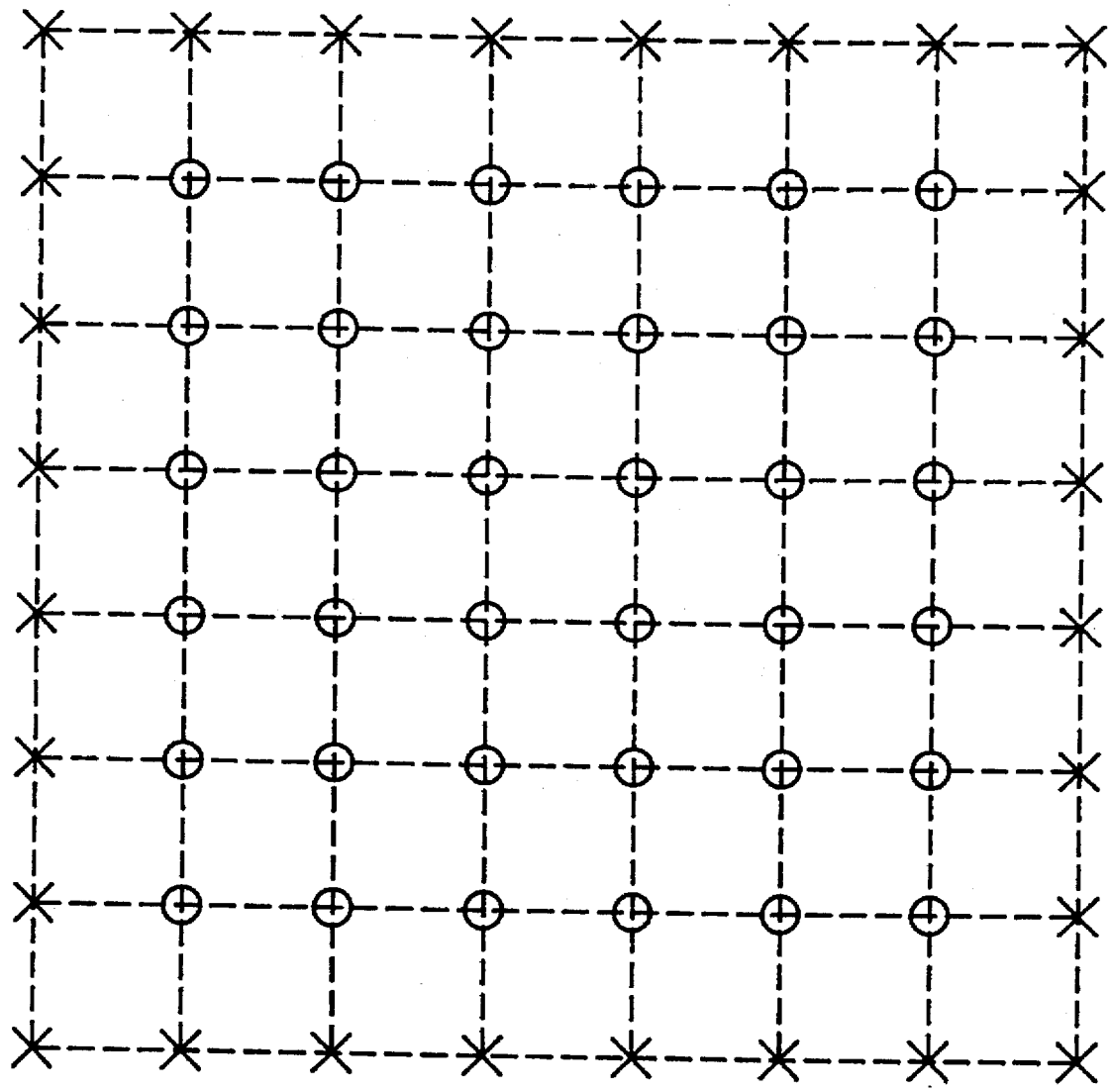
FIG. 8 illustrates a conventional two-dimensional physical system modeled as 64 grid points.

FIG. 7 shows two PEs, PE1 and PE2, each storing two sets of m-byte blocks, labeled code 1 and code 2. It is assumed that code blocks are of the same length, (e.g., 1 m-byte words), and that each code block is stored in an identical location in each PE, starting at address B1 and B2, respectively. When a broadcast instruction has to be modified using code 1 in PE 1 and code 2 in PE 2, 1 ILOAD instructions are broadcast from the central controller. The addresses A, A+1, ..., A+1-1, specified in the broadcast ILOAD instruction are modified by PE 1 to addresses B1, B1+1, ..., B1+1-1, and by PE 2 to B2, B2+1, ..., B2+1-1, respectively, by adding processor specific local offset as explained above. As a result, PE1 will have code 1 loaded into its local instruction buffer 24 while PE2 will have code 2 loaded into its local instruction buffer.

Similarly to the system shown in FIG. 1, based on data from the PEs' own data memory 22, the PEs can partially or totally disable the current instruction in the instruction register 2 as shown by the dotted line labelled "Disable" in FIG. 2.

The above structure and scheme are very simple, but they have certain inefficiencies.

For example, for every instruction in a sequence of dissimilar instructions, the PEs have to execute several ILOAD instructions and one SET_SEL_BITS instruction. If the dissimilar instruction sequences are executed repeatedly, the cost of build_load_sequence instructions can be amortized over the repeated executions of the dissimilar instruction sequences.

However, as long as the dissimilar sequence of instructions being executed repeatedly has more than one instruction in the sequence, multiple ILOAD instructions will be required for each instruction in the sequence, on every repetition of the sequence.

Figure 3:
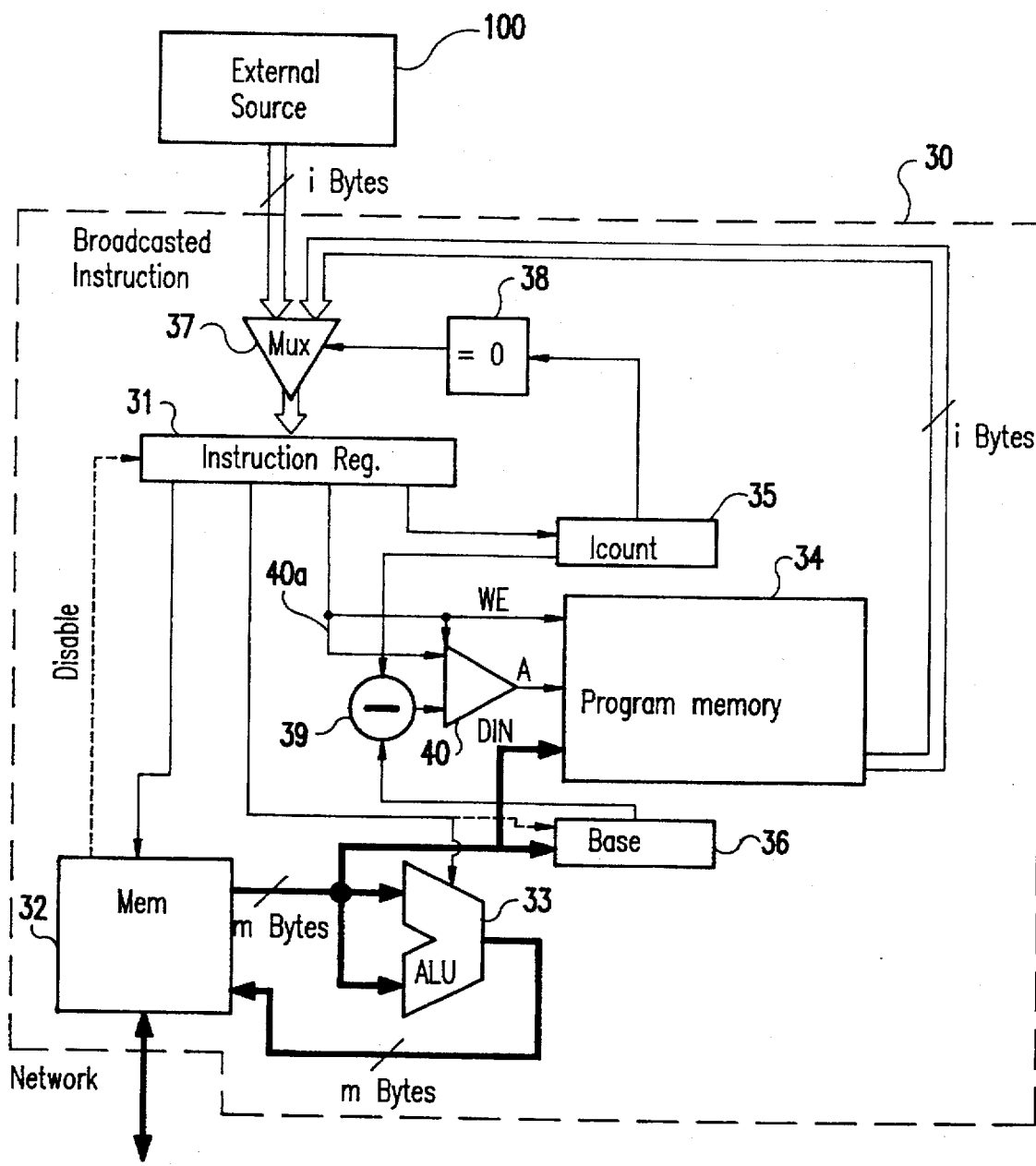
FIG. 3 illustrates a second embodiment of the present invention which incorporates a local program memory in the processing element in a SIMD parallel computer.

FIG. 3 illustrates a second aspect according to the present invention and illustrates an improvement to the structure (and related method) shown in FIG. 2.

Specifically, to amortize the overhead of ILOAD operation used to assemble the processor specific instruction into the local instruction buffer, the local instruction buffer of FIG. 2 is replaced by the program memory 34 shown in FIG. 3. The program memory includes a large number (preferably 1K to 16K words) of instruction words. Processor specific instructions can be assembled in the instruction words of the program memory by using the ILOAD instruction as defined earlier. Now, the ILOAD instructions have an additional immediate operand to select an instruction word in the program memory.

The improved processing element (PE) 30 of FIG. 3 includes an instruction register 31, a private data memory 32, and an ALU 33, similarly to the conventional system shown in FIG. 1 and the structure 20 according to the first aspect of the invention shown in FIG. 2.

However, PE 30 according to a second aspect of the invention also includes a program memory 34, an Icount register 35, a base register 36, a multiplexer 37, zero detector 38, an adder 39, and a multiplexer 40. The improved PE 30 is described hereinbelow.

Specifically, as mentioned above, to amortize the overhead of ILOAD operations used to assemble the processor specific instructions in the local instruction buffer, the local instruction buffer 21 shown in FIG. 2, is replaced by a program memory 34, as shown in FIG. 3, including a large number of instruction words.

The ILOAD instruction now has three operands and is specified mnemonically as ILOAD(x, A, B). The x and A operands have same function and meaning as described above. The new operand B selects the instruction word in the program memory 34 that will be updated by the ILOAD instruction. Thus, upon executing ILOAD(x, A, B), m-byte word is read from the PE's data memory at address A, and stored in bytes m, x to m (x+1)-1 in the PE's program memory at address B.

Each instruction word in the program memory can require a different pattern of select bits. In FIG. 3, the support for the select bits is not shown and therefore all m-byte blocks of an instruction are taken from the broadcast instruction, or all of them are taken from the processor's local program memory 34. However, it is relatively easy to increase the word size of the local program memory 34 in each processor such that the select bits to be used with the instructions are stored with the instruction word. When the instruction word is read out of the program memory, the select bits can be separated and combined with the output of zero detection logic 38 to generate control signals for the multiplexer 37.

The Icount register 35 and the base register 36 are provided to execute a sequence of instructions from the PE's private instruction memory 34. Registers 35, 36 replace the Sel_Bits register 26 of FIG. 2.

In place of the instruction that writes into the Sel_Bits register 26 (of FIG. 2), two new instructions are provided.

A first instruction, SET_ICOUNT (x), is for writing an immediate operand into the Icount register 35. Exectuing SET_ICOUNT (x) causes the Icount register 35 to be set to x. A second instruction LOAD_BASE (A) is for reading data (m-bytes) from location A of data memory 32 and storing the data being read out of the data memory 32 into the base register 36. The Icount register 35 always counts down to zero, unless it is being set by the current instruction.

A nonzero value in the Icount register 35 causes the PEs to choose (via multiplexer 37) the next instruction from their own program memory 34, rather than the broadcasted instruction from the central controller.

The instruction address for the program memory 34 is obtained by subtracting the contents of the Icount register 35 from the base register 36. To execute a sequence of instructions from the local program memory 34 of the PEs, the address of the last instruction in the sequence is placed in the Base register 36 using the LOAD_BASE instruction. After executing a broadcasted LOAD_BASE instruction, each PE can have a different value in its register 36.

Thereafter, the value s is placed in the Icount register 35, which causes the next S instructions to be executed out of the processor's local program memory 34.

If the width of the broadcasted instruction is not a critical design parameter, the multiplexer 37 that chooses between the local and broadcasted instruction can be controlled directly by an extra bit in the broadcasted instruction, rather than by the zero detector 38 attached to the Icount register 35.

In FIG. 3, A denotes the address lines for program memory 34. WE are the i+m write enable signals, one for each m-byte block of an instruction word. The WE signals are normally high, but one of them is set low in an ILOAD instruction, and enables the data read out of the data memory 32 to be written into the corresponding m-byte block of the word in program memory 34 selected by the address lines A. The lines labeled DIN bring the data read from the data memory by the ILOAD instruction to the program memory 34.

The output of multiplexor 40 provides the address lines A for the program memory. During the execution of an ILOAD instruction, the address presented to the program memory is an immediate operand of the broadcast ILOAD instruction, and carried on line 40a from the instruction register 31 to the multiplexor 40. The logical "AND" of all WE signals is used as the control input for multiplexor 40. Because one of the WE signals is low during an ILOAD instruction, the control input to multiplexor 40 is low during an ILOAD instruction, and therefore, the address on line 40a is selected as the address presented to the program memory 34.

When the PE is not executing an ILOAD instruction, the multiplexor selects its other input provided by the subtraction circuitry 39, and the address presented to the program memory is the result of subtracting ICOUNT register 35 from the Base register 36.

When the PEs of a SIMD computer must execute different instruction sequences simultaneously, the entire instruction sequences are assembled in the program memory 34 before any instruction from the sequence is executed. This operation can be accomplished by assembling one instruction at a time in consecutive locations of the program memory. The method of assembling an instruction in a specified word B of the program memory 34 is the same as that described earlier for assembling an instruction in local instruction buffer 24.

Once the whole sequence of instructions has been assembled in the PE's program memory 34, it can be executed by the PEs as follows. Assuming that there are S instructions in the sequence, the first instruction is assumed to be stored at address A and the last instruction therefore is stored at address A+S−1. First, the LOAD-BASE (A+S) instruction is issued to load the value A+S in the base register 36. Next, the SET-ICOUNT (S) instruction is issued to load the value S in the ICOUNT register 35.

Consequently, for the next S cycles the ICOUNT register will countdown from S to O, and while this register is non-zero for S cycles taking values S, S−1, S3, ..., 1, instructions will be read from program memory from locations A, A+1, ..., A+S−1, and these will be selected by the multiplexor 37 to be placed in instruction register 31 for execution.

The LOAD-BASE and SET.ICOUNT instructions are broadcast from the central controller 100 to all PEs. The PEs may add a processor specific offset to the argument of LOAD-BASE instruction before storing it in the base register 36.

Once again, if the PEs must execute dissimilar sequences of instructions, and each PE has the instructions it needs to execute already loaded in its local program memory (perhaps because the same sequence of instructions has been executed by the PE previously), then only the LOAD-BASE and SET-ICOUNT instructions are needed to start off the execution of instruction sequence from the PEs local program memory 34. Thus, if the different sequence of instructions assigned to the different PEs had to be executed repeatedly, then the overhead in executing them would be significantly lower than that of FIG. 2 implementation.

Finally, if the dissimilar sequence of instructions, that must be executed by different PEs of a SIMD computer simultaneously to achieve good performance, can be determined at compile time, then the compiler can generate these instruction sequences to be loaded into the PE's local program memory 34, when the program is loaded in the array controller 100. Similarly to the case of the implementation of the system of FIG. 2, all instruction sequences can be loaded in each PE's local program memory 34, and the PEs can locally modify the operand of the LOAD_BASE instruction to select the desired sequence.

Once again, to keep the programming paradigm simple, the instruction stored in the local program memory 34 is not allowed to change the ICOUNT register. Preferably, LOAD_BASE and ILOAD opcodes should also not be issued from local program memory 34.

Figure 4:
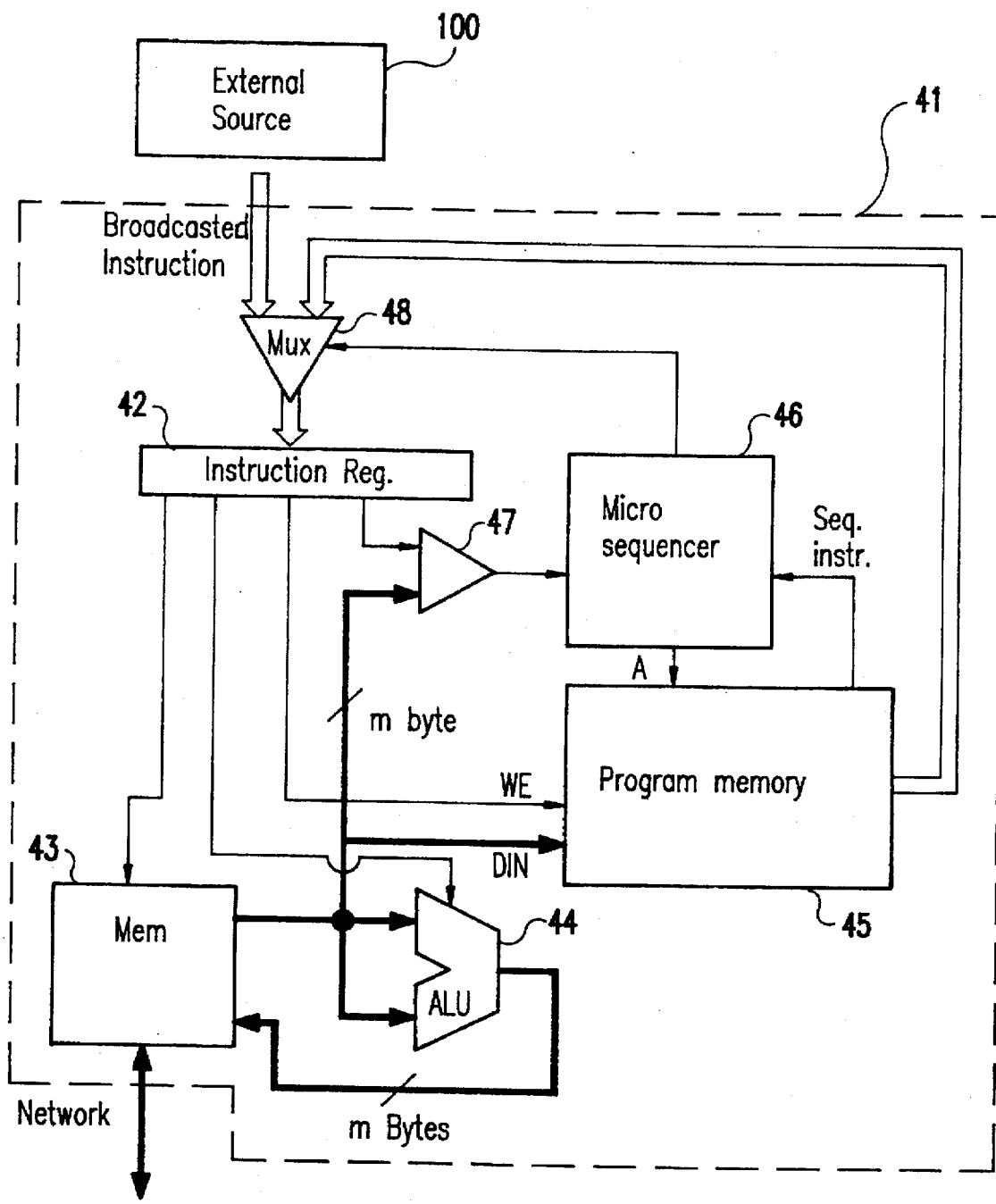
FIG. 4 illustrates a third embodiment of the present invention which uses a microsequencer (e.g., 2910 devices) in the PEs of a SIMD computer to allow the PEs to execute different instructions simultaneously.

FIG. 4 illustrates a third aspect according to the present invention and yet another variation of the above-described scheme. The improved processing element 41 of FIG. 4 includes an instruction register 42, a private data memory 43, and an ALU 44, similarly to the conventional system shown in FIG. 1 and the structure 20, 30 according to the first and second aspects of the invention respectively shown in FIGS. 2 and 3.

The improved PE 41 also includes a program memory 45, a microsequencer 46 and a multiplexer 48.

In FIG. 4, the address generation logic for the PE's local program memory 34 shown in FIG. 3 is replaced by a commercially available microsequencer 46 (e.g., 2910 chips commercially available from Advanced Micro Devices (AMD), IDT, Vittesse, etc.).

The microsequencer 46 subsumes the function of the Icount register 35 and the Base register 36 (shown in FIG. 3), the adder 39 and multiplexer 40 used for generating address for the PE's program memory 34, and the zero detector 38 used with the Icount register 35 shown in FIG. 3.

The WE, DIN, and A signals are used in the same manner as in the apparatus of FIG. 3 and are described above. Briefly, as mentioned above, the apparatus of FIG. 4 is the same as that of FIG. 3 except that microsequencer 46 is used to implement the function of Base and Icount registers, subtraction circuit 39 and zero detector 38. The operation of this apparatus is the same as that of the apparatus of FIG. 3. Thus, for clarity and brevity, such is not described herein.

With the present invention, a performance advantage results because of the private instruction memory (e.g., the local instruction buffer 24 in FIG. 2 and the program memory 34/45 in FIGS. 3–4) in each PE, in the following frequently occurring situations. The spatial decomposition of data in a straight-forward manner may require different types of calculations to be performed on different data segments.

For example, on a regular grid the boundary points and interior points may require different processing. In this case, the different instruction sequences needed to process the data in different processors can be stored at the same address in the private instruction memories of the PEs, and can be applied to the private data of PEs by broadcasting the identical base address of these instructions and the instruction counts from the central controller 100.

In the second case, the choice of the instruction sequence to be applied to the data segment in a PE may depend on the value of the same or different variables in the PEs, rather than on the spatial position of the data in the global structure.

For example, when programming matrix factorization or Gaussian elimination, in each step of the algorithm one row of the matrix is the pivot row and must be processed differently from the other rows. A new row becomes the pivot row in each step. If the matrix is partitioned among the processors by rows, then in any given step the processors containing the pivot row must execute a different sequence of instructions than the processors containing non-pivot rows.

To handle this case, the instruction sequences to process the pivot and non-pivot rows are stored in each PE (in the program memory). Each PE selects which sequence it executes by storing the corresponding base address in the base address register 36 shown in FIG. 3.

Thus, with the invention, a method and apparatus are provided in which a local instruction buffer or a local instruction memory is utilized, thereby allowing the applicability of SIMD machines to be extended to a much larger set of applications and in which the need to execute different instructions in all PEs simultaneously does not degrade the efficiency of the SIMD machines.

As described above, according to the present invention, a SIMD computer includes a plurality of processing elements, each of which has a local instruction source and a multiplexer for modifying the instruction to execute dissimilar sequences of instructions.

According to the invention, a local instruction buffer for storing a single instruction, or several blocks of several instructions is employed. In the invention, the results of operations by the ALU are stored in the processors' local data store, and the modified instruction, or a sequence of modified instructions saved in the local instruction store, can be used by the SIMD processors repeatedly, when selected by the global instruction.

A key advantage of the present invention is that, while in the conventional systems the type of modifications possible locally are limited by the hardware support implemented in the processing elements, in the present invention any imaginable modification is possible because the general purpose ALU computes the modified instruction.

Further, while the conventional approach is geared more towards modifying operands in an instruction, and more specifically, operands that appear in an identical position in all instructions, the present invention includes means for modifying the whole instruction altogether.

Additionally, the present invention allows for the capability in the processing elements in a row to locally modify the identical instructions they receive.

Further, the broadcast instructions are modified locally within the processor by substituting them partially or fully with the information contained in the local instruction buffer, which in turn is loaded from the processor's local data memory under the control of the broadcast programs. Since the processors do not autonomously fetch instructions and modify the broadcast instructions instead, under control of the broadcast program, instruction fetch and decode logic and synchronization circuit are not needed in each processing element.

The present invention allows the broadcast instruction issued by an external source (e.g., central controller, array controller, etc.) to be modified by the array elements (e.g., the processing element) of the SIMD machine. Thus, local modification is possible with the structure of the invention and different processors may execute different instructions, depending on their logical index or data content.

While the invention has been described in terms of several preferred embodiments, those skilled in the art will recognize that the invention can be practiced with modification within the spirit and scope of the appended claims.

For example, the local instruction buffer 24 in FIG. 2 receives the m-byte blocks to be stored in it from an output of data memory 22 on bus 27. Alternatively, the data (m-byte blocks or microoperations) to be stored in the local instruction buffer 24 can be taken from the output of ALU 23. Similarly in the apparatus of FIG. 3, the microoperations to be stored in the instruction words of program memory 34 and/or the address to be loaded in Base register 36 can be taken from the output of ALU 33 rather than the output of data memory 32.

Having thus described our invention, what we claim as new and desire to secure by Letters Patent is as follows:

1. A single instruction multiple data stream (SIMD) array processor, comprising:

a plurality of processing elements (PEs), each for receiving an instruction broadcasted from an external source, each of said plurality of processing elements including:

a memory for storing data therein;

a first multiplexer for receiving said broadcasted instruction;

an instruction register, coupled to said memory and to said first multiplexer, for receiving an output from said first multiplexer and for providing control signals and an output to said memory;

storage means, coupled to said instruction register and to said memory, for storing at least one instruction, said at least one instruction comprising data read out of the memory and placed in the storage means, said first multiplexer further receiving said at least one instruction in said storage means; and means for modifying said at least one instruction in its entirety to respectively create a modified instruction and storing said modified instruction in said storage means to be executed as a next instruction, said modified instruction being used repeatedly when selected by said broadcasted instruction from said external source, said modifying means including means for selecting one of said broadcasted instruction and said modified instruction to be output to said instruction register, wherein a first PE of said PEs modifies said at least one instruction differently than a second PE of said PEs and said first PE modifies a first portion of said at least one instruction and said second PE modifies a second portion of said at least one instruction.

2. The processor according to claim 1, wherein said storage means comprises a local instruction buffer.

3. The processor according to claim 2, wherein said modifying means comprises an arithmetic logic unit (ALU) and a select bits generator, said select bits generator receiving an output from said instruction register and providing an input to said first multiplexer.

4. The processor according to claim 3, wherein said ALU arranges said modified instruction in said local instruction buffer using a portion of said data and a portion of said at least one instruction.

5. The processor according to claim 3, wherein said broadcasted instruction comprises broadcasted microoperations and said modified instruction comprises modified microoperations, said multiplexer for selecting at least one of said broadcasted microoperations and at least one of said modified microoperations to form a single instruction to be output to said ALU.

6. The processor according to claim 3, wherein said means for selecting comprises said select bits generator and said multiplexer, said select bits generator outputting select bits to said multiplexer, and said multiplexer selecting one of said broadcasted instruction and said modified instruction based on said select bits.

7. The processor according to claim 1, wherein said storage means comprises a program memory.

8. The processor according to claim 7, wherein said modifying means comprises:

an arithmetic logic unit (ALU) for receiving control signals from said instruction register and for performing operations specified by the control signals on the data received from said data memory, a base count register coupled to said memory, an Icount register for receiving an output from said instruction register, an adder for subtracting the output from said Icount register from the output of said base count register, and a second multiplexer for selecting between an output from said instruction register and an output of said adder, to thereby provide an address to said program memory.

9. The processor according to claim 8, further comprising a zero detection logic for receiving an output from said Icount register and for providing an input to said first multiplexer.

10. The processor according to claim 1, wherein said modifying means modifies said broadcast instruction locally within each of said processing elements by substituting in the broadcast instruction at least one microoperation stored in said storage means.

11. The processor according to claim 1, wherein said modifying means includes:

a program memory coupled to said memory and storing a plurality of instruction words, for receiving an output from said memory and said instruction register, and for providing an output to said first multiplexer;

an arithmetic logic unit (ALU) for receiving an output from said instruction register and coupled to said memory and for providing an output back to said memory; and a microsequencer for receiving a sequence instruction from said program memory and for providing an output to said program memory and an output to said first multiplexer.

12. The processor according to claim 11, further comprising a second multiplexer for selecting between an output from said instruction register and an output from said memory, for providing an address to said microsequencer.

13. The processor according to claim 1, wherein said modifying means modifies said at least one instruction based on said data read out of the memory.

14. The processor according to claim 1, wherein said first PE performs a first operation based on a first broadcasted instruction and said second PE performs a second operation based on said first broadcasted instruction.

15. The processor according to claim 1, wherein said data comprises modifications to said instructions.

16. The processor according to claim 15, wherein a first PE of said PEs includes a first memory and a second PE of said PEs includes a second memory, wherein said data in said first memory is different than said data in said second memory.

17. The processor according to claim 1, wherein said modifying means modifies a portion of said at least one instruction.

18. The processor according to claim 1, wherein said at least one instruction includes an address field and said modifying means reads said data from said memory based on said address and changes said address.

* * * * *